Feb. 9, 1960  H. F. JOHNSTONE  2,924,294
APPARATUS FOR CLEANING GASES WITH ELECTROSTATICALLY
CHARGED PARTICLES
Filed Jan. 21, 1958
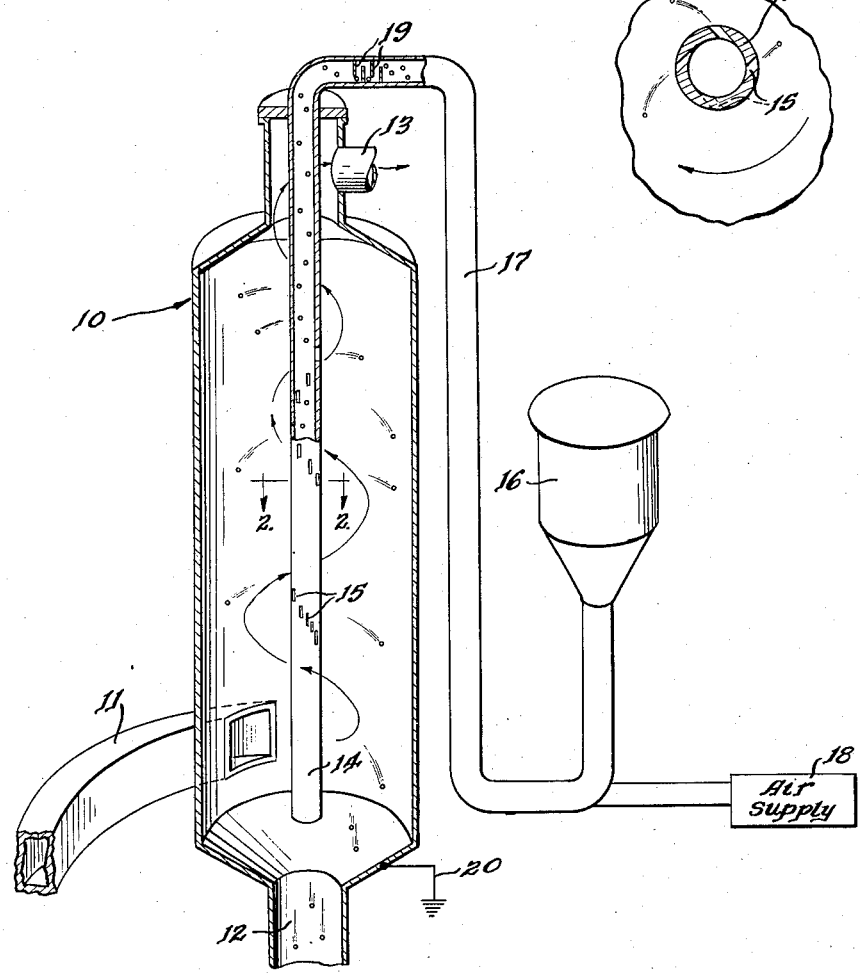
INVENTOR.
Henry F. Johnstone
BY
Roland A. Anderson
Attorney

United States Patent Office 2,924,294
Patented Feb. 9, 1960

2,924,294

APPARATUS FOR CLEANING GASES WITH ELECTROSTATICALLY CHARGED PARTICLES

Henry F. Johnstone, Urbana, Ill., assignor to the United States of America as represented by the United States Atomic Energy Commission Application January 21, 1958, Serial No. 710,368

2 Claims. (Cl. 183—7)

This invention relates to the removal of aerosol particles and other finely divided suspended particles from air or other gases.

It is an object of the present invention to provide an apparatus for removing aerosol particles from gases.

It is a further object of the present invention to remove suspended material from air or other gases with the help of electrostatically charged solid pellets.

It is also an object of the present invention to remove suspended particles from air by combining the effects of centrifugal force and electrostatic attraction.

These and other objects of the present invention are attained by my novel apparatus in which electrostatically charged small pellets are introduced into the center of a rotating body of the gas to be cleaned. Centrifugal force throws the small pellets to the edge of the rotating body. During their passage through the gas stream, they collect the suspended particles by electrostatic attraction.

The invention will now be described in connection with the accompanying drawing wherein Figure 1 represents a schematic view of my novel air cleaner and Figure 2 is an enlarged cross-sectional view taken on line 2—2 of Figure 1.

In the drawing the numeral 10 represents a cyclone having a tangential inlet 11 near the bottom thereof. Cyclone 10 has a lower outlet 12 and upper outlet 13. An axially disposed feed tube 14 having a plurality of vertically disposed slits 15 therein is provided for the purpose of introducing small pellets to the center of the cyclone. Slits 15 are arranged spirally about the feed tube 14 and are located progressively closer nearer the bottom of the tube. Tube 14 is closed at the bottom. By this construction the number of small pellets leaving the tube 14 at different points is made relatively uniform. The slits penetrate the wall of the tube at a 45° angle to the radial, the direction being in the direction of rotation of the gas, as shown by Figure 2 of the drawing. The pellets are thereby directed into the whirling body of air to promote contact between the air and the particles. The pellets are kept in a hopper 16 and are conveyed pneumatically to cyclone 10 through conduit 17 by air from source 18. Baffles 19 are provided in conduit 17. These may be solid baffles which extend part way across the conduit 17 or may be screens which extend all the way across the conduit 17. The cyclone is grounded at 20.

Operation of the device will now be explained. Air or any other gas containing fine particles in suspension is introduced through inlet 11 and, due to its tangential introduction, flows upward spirally through cyclone 10 till it reaches outlet 13. Small pellets are introduced into conduit 17 from hopper 16 and are conveyed therethrough pneumatically. The pellets in passing through conduit 17 and impinging on baffles 19 pick up an electrostatic charge. The charged pellets then pass through tube 14 and slits 15 therein into the center of the rotating body of gas. Centrifugal force thereupon forces the pellets to the walls of cyclone 10. While passing from tube 14 to the walls of the cyclone, the pellets pick up and remove the fine particles from the air by impaction and by electrostatic attraction. The electrostatic charge on the pellets carrying the fine particles is removed partially or completely by grounding the wall. The pellets after striking the wall drop to the bottom of the cyclone carrying the aerosols with them and are discharged through outlet 12. If the pellets are not completely discharged, the walls of the cyclone 10 may be rapped or vibrated to assist in the removal of the pellets from the walls and to ensure that they drop to the bottom of the cyclone. The pellets will remove both liquid and solid aerosol particles from the air stream.

It can be shown theoretically and has been shown experimentally that small pellets passing through a gas stream have a much higher efficiency for collecting aerosol particles if they carry a small electrical charge than they would have if the collection was entirely by impaction. This is true whether or not the aerosol particles are charged opposite in sign to the pellets because of the induced charges.

The pellets I propose to use are small spheres having a diameter of between 0.1 millimeter and 1.0 millimeter. The spheres may be glass or may be formed from such plastics as polystyrene, polymerized methylmethacrylate, polymerized styrene divinylbenzene resins.

The electrostatic charge on the pellets is directly proportional to the air rate and inversely proportional to the feed rate. Table I shows the results of a few tests of the effect of the air rate and the feed rate on the charge on the pellets. For these tests the charging conduit was a 3 inch by 5 foot galvanized iron tube which enclosed a galvanized wire screen baffle. The importance of the baffle was demonstrated by removing it during a run. Without the baffle in the tube there was no measurable charge developed on the pellets.

TABLE I

*Effect of air rate and rate of feed on electrostatic charge on pellets*

[Note: The charge on the pellets was positive.]

A. GLASS PELLETS

| Air Velocity, ft./sec. | Feed Rate, g./sec. | Electrons per Pellet×10⁻⁷ |
|---|---|---|
| 23.8 | 27.3 | 2.62 |
| 34.7 | 7.58 | 12.60 |
| 44.8 | 8.00 | 19.05 |

B. PLASTIC PELLETS

| Air Velocity, ft./sec. | Feed Rate, g./sec. | Electrons per Pellet×10⁻⁷ |
|---|---|---|
| 21.6 | 11.70 | 0.438 |
| 26.1 | 11.80 | 0.622 |
| 29.6 | 3.90 | 0.940 |

Tests to show the efficacy of the process were made on an air stream within which aerosols of ammonium sulfite were generated. The aerosols were generated by injecting ammonia and sulfur dioxide through short sections of capillary tubing into air streams which were then mixed. The ammonia was introduced through a T-tube directed downstream seven feet from the acid gas inlet. Salt nuclei were injected into the main stream upstream of the ammonia and acid gas inlets. The cyclone employed was 18 inches in diameter and 5 feet high. The walls were 24 gauge galvanized iron. The air from a 2000-cu. ft. per minute blower entered tangentially at the bottom and flowed upward spirally and set up a centrifugal force field which caused pellets introduced through ⅛ x 1½ inch slits placed at a 45° angle in a "Plexiglas" (a polymerized methyl methacrylate resin) tube at the center to move towards the wall. The slits started two inches above the tangential entrance and were continued for two feet with the slits becoming further apart at the top of the tube. Electrification of the pellets was achieved by pneumatic conveyance through a 1¼ inch "Plexiglas" tube provided with four "Plexiglas" baffles. The velocity of the air was 25–31 feet per second and charges of up to $10^8$ electrons per particle were obtained. The discharged pellets were washed with water, dried, and returned to the hopper for recycle. Table II gives the details of this test.

TABLE II

*Removal of ammonium sulfite aerosols by charged pellets*

[Air rate: 100 c.f.m.]

A. GLASS PELLETS (30–40 MESH)

| Run No. | Pellet Feed Rate, g./sec. | Inlet Ammonia Concentration, g./min. | Mass Medium Diameter of Aerosol, microns | Percent Removed |
|---|---|---|---|---|
| 1-1 | 14.7 | 0.193 | 2.00 | 40.6 |
| 1-2 | 14.7 | 0.0980 | 2.00 | 34.0 |
| 1-3 | 15.5 | 0.123 | 2.40 | 30.0 |
| 1-4 | 15.5 | 0.0875 | 2.40 | 26.9 |
| 1-5 | 15.5 | 0.139 | 2.40 | 26.1 |
| 1-6 | 12.8 | 0.0922 | 2.51 | 21.5 |
| 1-7 | 12.8 | 0.157 | 2.51 | 20.5 |

B. PLASTIC PELLETS [1] (50–100 MESH)

| Run No. | Pellet Feed Rate, g./sec. | Inlet Ammonia Concentration, g./min. | Mass Medium Diameter of Aerosol, microns | Percent Removed |
|---|---|---|---|---|
| 1-8 | 3.00 | 0.0691 | 2.60 | 41.8 |
| 1-9 | 3.10 | 0.579 | 2.70 | 39.5 |
| 1-10 | 3.10 | 0.558 | 2.70 | 38.5 |
| 1-11 | 3.05 | 0.0552 | 3.00 | 22.6 |
| 1-12 | 3.42 | 0.608 | 3.10 | 20.5 |
| 1-13 | 3.42 | 0.564 | 3.10 | 19.5 |

[1] A polymerized divinylbenzene resin.

These results show clearly that good collection of aerosol particles may be obtained by electrostatically charged solid pellets. It is expected that higher collection efficiency would be obtained with cyclones of large diameter.

The described device has several advantages in comparison with devices previously utilized for the purpose such as the electrified wet scrubber, the ordinary cyclone scrubber, and the Cottrell precipitator. The electrified wet scrubber requires a high voltage to charge the water droplets and tends to saturate the gas with water vapor. Difficulties are sometimes encountered in the Cottrell device because of the high voltages required which lead to insulation failure, and reentrainment of the dust already collected. Continual removal of the collected aerosol can be provided in my device. Much greater efficiency in the removal of aerosols from a gas is obtained in my device than in an ordinary cyclone. Particles which are so small that the efficiency of an ordinary cyclone is very low can be removed from air according to my invention with much greater efficiency.

It will be understood that this invention is not to be limited to the details given herein but that it may be modified within the scope of the appended claims.

What is claimed is:

1. In an air cleaner comprising a cyclone having a tangential inlet, a lower outlet and an upper outlet, the improvement comprising a feed hopper for solid pellets, a feeding conduit in communication with said feed hopper, baffles in said conduit for electrostatically charging the pellets impinging thereon, a feed tube extending axially of said cyclone in communication with said conduit, vertically spaced slits in said feed tube, and a source of air for blowing said pellets through the conduit into the center of the cyclone.

2. In an air cleaner comprising a cyclone having a tangential inlet, a lower outlet and an upper outlet, the improvement comprising a feed hopper for solid pellets, a feeding conduit in communication with said feed hopper, baffles in said conduit for electrostatically charging the pellets impinging thereon, a feed tube extending axially of said cyclone in communication with said conduit, a plurality of vertically disposed slits located in and arranged spirally about said feed tube, said slits being located progressively closer nearer the bottom of the feed tube and penetrating the wall thereof at an angle to the radial such as to eject the pellets in an opposite direction to the direction of rotation of the gas, and a source of air for blowing said pellets into the center of the cyclone.

References Cited in the file of this patent

UNITED STATES PATENTS

| 2,281,254 | Anthony | Apr. 28, 1942 |

FOREIGN PATENTS

| 5,051 | Great Britain | Aug. 14, 1914 |
| 292,479 | Great Britain | June 13, 1929 |